United States Patent [19]
Fukuda et al.

[11] Patent Number: 6,040,400
[45] Date of Patent: Mar. 21, 2000

[54] ADDITION-CURABLE PERFLUORO COMPOUND-CONTAINING COMPOSITION

[75] Inventors: Kenichi Fukuda, Annaka; Yasuo Tarumi, Takasaki, both of Japan

[73] Assignee: Shin-Etsu Chemical Co., Ltd., Tokyo, Japan

[21] Appl. No.: 09/168,376

[22] Filed: Oct. 8, 1998

[30] Foreign Application Priority Data

Oct. 9, 1997 [JP] Japan .................................. 9-293401

[51] Int. Cl.$^7$ ...................................... C08F 16/24
[52] U.S. Cl. .......................... 526/126; 526/154; 526/247; 526/252
[58] Field of Search .................... 526/247, 126, 526/154

[56] References Cited

U.S. PATENT DOCUMENTS 5,378,790  1/1995  Michalczyk et al. .

OTHER PUBLICATIONS

Answer 2 of 37—In House Computer Searched Matsuda et al—JP97–203854—19970714 Abstract pp. 9–14, 1997.
Answer 4 of 37—In House Computer Searched Sato et al—JP97–176400—19970617 Abstract pp. 18–25, 1997.

*Primary Examiner*—Bernard Lipman
*Attorney, Agent, or Firm*—Oblon, Spivak, McClelland, Maier & Neustadt, P.C.

[57] ABSTRACT

An addition-curable composition is comprised essentially of (A) a linear perfluoro compound containing at least two alkenyl groups per molecule and having a perfluoro structure in its backbone chain, (B) a linear perfluoro compound containing one alkenyl group per molecule and having a perfluoro structure in its backbone chain, (C) an organosilicon compound containing at least two hydrosilyl groups per molecule, and (D) a platinum family metal catalyst. A cured gel product obtained from the composition has a penetration of 1 to 200 (ASTM D-1403 using ¼-scale cone). The composition can form a fluorine-containing cured gel product excellent in chemical resistance and solvent resistance, and low in moisture permeability.

10 Claims, No Drawings

ADDITION-CURABLE PERFLUORO COMPOUND-CONTAINING COMPOSITION

BACKGROUND OF THE INVENTION

1. Field of the Invention

The present invention relates to an addition-curable perfluoro compound-containing composition capable of forming a cured gel product excellent in chemical resistance, solvent resistance, etc.

2. Description of the Prior Art

Cured silicone rubber products in a gel state (cured gel products) are used as a potting or sealing material for electrical and electronic parts and as a covering material for protecting controlling-circuit elements, such as power transistors, ICs and condensers, from a thermal and mechanical damage externally induced, by making use of excellent electrical and heat insulating properties, stable electrical properties, flexibility and the like which are possessed by the cured gel products. A typical example of silicone products to form the cured gel products includes an addition-curable organopolysiloxane composition. A variety of such addition-curable organopolysiloxane compositions are conventionally known. For example, there is known a composition comprising an organopolysiloxane containing a vinyl group bonded to a silicon atom, and an organohydrogenpolysiloxane containing a hydrogen atom bonded to a silicon atom, that is, a hydrosilyl (SiH) group, for obtaining a cured gel product by subjecting the composition to crosslinking reaction in the presence of a platinum catalyst [Japanese Pre-examination Patent Publication (kokai) Nos. 56-143241, 62-3959, 63-35655, 63-33475, etc.].

However, the cured gel products obtained from these organopolysiloxane compositions can not maintain their good properties due to swelling, deterioration and the like caused by chemicals, such as strong bases and strong acids; solvents, such as toluene, alcohols and gasoline; or water or moisture.

SUMMARY OF THE INVENTION

Accordingly, an object of the present invention is to provide an addition curable perfluoro compound-containing composition capable of forming a fluorine-containing cured gelproduct excellent in chemical resistance and solvent resistance, and low in moisture permeability.

The present inventors have variously studied in order to eliminate the above defects of the conventional addition-curable organopolysiloxane compositions and, as a result, have found that an addition-curable composition comprising a combination of a linear perfluoro compound containing at least two alkenyl groups as a base component with a linear perfluoro compound containing one alkenyl group as a reactive diluent could attain the above object. Thus, the present invention has been completed.

The present invention provides an addition-curable perfluoro compound-containing composition comprising:

(A) a linear perfluoro compound containing at least two alkenyl groups per molecule and having a perfluoro structure in its backbone chain, (B) a linear perfluoro compound containing one alkenyl group per molecule and having a perfluoro structure in its backbone chain, (C) an organosilicon compound containing at least two hydrosilyl groups per molecule, and (D) a platinum family metal catalyst; and a cured gel product having a penetration of 1 to 200 (according to ASTM D-1403) obtained by curing the composition.

The curable composition of the present invention can form a cured gel product (hardness: 1 to 200 in terms of penetration according to ASTM D-1403) excellent in chemical resistance and solvent resistance, and low in moisture permeability, by the use of a linear perfluoro compound containing at least two alkenyl groups as a base component in combination with a linear perfluoro compound containing one alkenyl group as a reactive diluent. Also due to the above reason, it is expected that curing of the composition can be stabilized and oil-bleeding from the cured product can be effectively prevented.

DESCRIPTION OF THE PREFERRED EMBODIMENTS

Linear perfluoro compounds of component (A)

The component (A) used in the composition of the present invention is a linear perfluoro compound containing at least two alkenyl groups per molecule and having a perfluoro structure in its backbone chain. The perfluoro compound of component (A) is a base component of the composition. The perfluoro compound of this type includes, for example, one represented by the following general formula (1).

General formula (1):

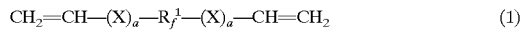

$$CH_2=CH-(X)_a-R_f^1-(X)_a-CH=CH_2 \quad (1)$$

wherein X is independently $-CH_2-$, $-CH_2O-$, $-CH_2OCH_2-$ or $-Y-NR^1-CO-$
wherein Y is $-CH_2-$ or

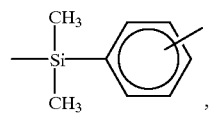

and $R^1$ is a hydrogen atom or an unsubstituted or substituted monovalent hydrocarbon group, preferably an unsubstituted or substituted monovalent hydrocarbon group having 1 to 12 carbon atoms, more preferably 1 to 10 carbon atoms; $R_f^1$ is a divalent perfluoroalkylene group or a divalent perfluoropolyoxyalkylene group (or divalent perfluoropolyether group); and a is independently 0 or 1. The unsubstituted or substituted monovalent hydrocarbon group of said $R^1$ includes, for example, an alkyl group, such as a methyl group, an ethyl group, a propyl group and an isopropyl group; a cycloalkenyl group, such as a cyclohexyl group; an alkenyl group, such as a vinyl group and an allyl group; an aryl group, such as a phenyl group and tolyl group; and a group in which at least part of hydrogens bonded to the carbon atoms of said hydrocarbon groups has been substituted with a halogen atom or the like, for example, a fluoroalkyl group, such as a 3,3,3-trifluoropropyl group and a 3,3,4,4,5,5,6,6,6-nonafluorohexyl group. Among them, preferred are a methyl group, a phenyl group and an allyl group.

In the general formula (1), the divalent perfluoroalkylene group represented by $R_f^1$ includes preferably one represented by the following general formula (1a):

$$-C_mF_{2m}- \quad (1a)$$

wherein m is an integer of 1 to 10, preferably 2 to 6.

The divalent perfluoropolyoxyalkylene group represented by $R_f^1$ includes preferably at least one member selected from the group consisting of the groups represented by the following general formulas (1b) to (1e) below.

The general formula (1b):

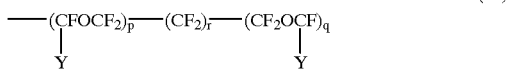

wherein Y is a fluorine atom or a —CF$_3$ group, and p, q and r are integers satisfying p≧1, q≧1, 2≦p+q≦200, particularly 2≦p+q≦110, and 0≦r≦6.

The general formula (1c):

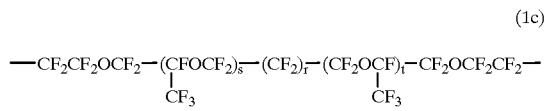

wherein r, s and t are integers satisfying 0≦r≦6, s≧0, t≧0, and 0≦s+t≦200, particularly 2≦s+t≦110.

The general formula (1d):

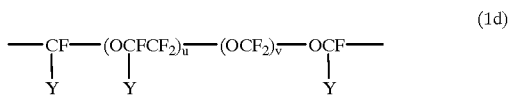

wherein Y is a fluorine atom or a —CF$_3$ group, and u and v are each an integer satisfying 1≦u≦100 and 1≦v≦50.

The general formula (1e):

$$-CF_2CF_2-(OCF_2CF_2CF_2)_w-OCF_2CF_2- \quad (1e)$$

wherein w is an integer satisfying 1≦w≦100.

In the general formula (1), specific examples of $R_f^1$ include the following groups:

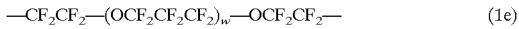

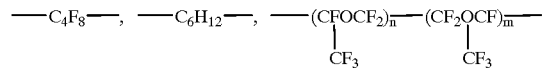

wherein n and m are each an integer of 1 or more satisfying n+m=2 to 200, $$-CF_2CF_2OCF_2(CF_2)_2CF_2OCF_2CF_2-,$$

$$-CF_2CF_2OCF_2CFOCF_2(CF_2)_2CF_2OCFCF_2OCF_2CF_2-,$$
$$\phantom{-CF_2CF_2OCF_2}|\phantom{CF_2(CF_2)_2CF_2OC}|$$
$$\phantom{-CF_2CF_2OCF_2}CF_3\phantom{(CF_2)_2CF_2OC}CF_3$$

$$-CF_2(OCF_2CF_2)_n(OCF_2)_mOCF_2-$$

wherein n and m are each an integer of 1 to 100,

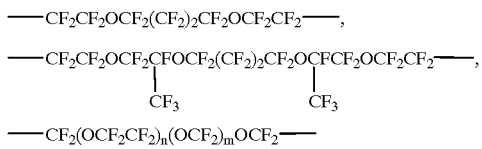

wherein n and m are each an integer of 1 to 100, and —CF$_2$CF$_2$(OCF$_2$CF$_2$CF$_2$)$_n$OCF$_2$CF$_2$— wherein n is an integer of 5 to 100.

Further, an alkenyl group in the component (A) includes preferably, for example, a group having a —CH=CH$_2$ structure at its both terminal ends, such as a vinyl group and an allyl group. In the general formula (1), the vinyl groups present on the both terminal ends may be each bonded directly to a terminal end of the backbone chain Rf$^1$ or may be bonded thereto through a divalent connecting group represented by X in the general formula (1).

In addition to an alkenyl group such as a vinyl group and an allyl group, the component (A) may contain alicyclic unsaturated groups such as a cycloalkenyl group.

The component (A) of the general formula (1) as set forth above can be used singly or in a combination of two or more thereof.

In order to use the composition of the present invention for casting, potting, coating, impregnation, adhesion or the like, the composition should have a suitable flowability and have suitable physical properties in curing. From this view point, it is desired that the viscosity (at 25° C.) of the component (A) is in the range of 5 to 100,000 cSt and that particularly it should be selected depending on purposes of the composition.

Linear perfluoro compounds of component (B)

The perfluoro compound of component (B) used in the composition of the present invention is a linear perfluoro compound containing one alkyl group per molecule and having a perfluoro structure in its backbone chain. The perfluoro compound of component (B) is used as a reactive diluent for the composition. The perfluoro compound of component (B) includes, for example, one represented by the following general formula (2):

$$R_f^2-(X)_a-CH=CH_2 \quad (2)$$

wherein X and a are as defined above, and $R_f^2$ is a monovalent perfluoroalkyl group or a monovalent perfluoropolyether group.

In the general formula (2), the monovalent perfluoroalkyl group represented by $R_f^2$ includes preferably one represented by the following general formula (2a):

$$C_mF_{2m+1}- \quad (2a)$$

wherein m is an integer of 1 to 20, preferably 2 to 10.

The monovalent perfluoropolyether group represented by $R_f^2$ is preferably at least one group selected from the group consisting of the groups having the following general formulas (2b) and (2c).

General formula (2b):

wherein p is an integer of 1 or more, preferably 2 to 200.

General formula (2c):

wherein q is an integer of 1 or more, preferably 2 to 200.

In the general formula (2), specific examples of $R_f^2$ include the following groups:

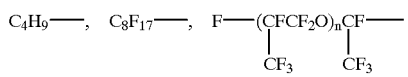

wherein n is an integer of 2 to 200, and $$F-(\underset{\underset{CF_3}{|}}{C}FCF_2O)_{\overline{n}}-\underset{\underset{CF_3}{|}}{C}FCF_2OCF_2CF_2-$$

wherein n is an integer of 2 to 200.

Further, the alkenyl group in the component (B) includes preferably, for example, a group having a —CH=CH$_2$ structure at its terminal end, such as a vinyl group and an allyl group, as in the general formula (1). The vinyl group in the formula (2) may be bonded directly to the terminal end of the backbone chain R$_f^2$ or may be bonded thereto through a divalent connecting group represented by X.

In addition to an alkenyl group such as a vinyl group and an allyl group, the component (B) may contain alicyclic unsaturated groups such as a cycloalkenyl group.

The component (B) of the general formula (2) can be singly or in a combination of two or more thereof.

Also from the same reason as in the component (A), it is desired that the viscosity (at 25° C.) of the component (B) is in the range of 5 to 100,000 cSt and that the optimum viscosity should be selected depending on the purposes of the composition.

The amount of component (B) to be mixed is suitably 10 to 300 parts by weight per 100 parts by weight of the component (A).

Organosilicon compounds of component (C)

The organosilicon compound of component (C) used in the present composition is an organohydrogensiloxane containing at least two hydrosilyl groups (SiH) per molecule and acts as a crosslinking and chain-extending agent for the component (A). Further in addition to the at least two hydrosilyl groups (SiH), the organosilicon compound preferably contains in the molecule a divalent perfluoroalkylene group, a divalent perfluoropolyoxyalkylene group (divalent perfluoropolyether group), at least one monovalent perfluoroalkyl group, at least one monovalent perfluoropolyether group, or a mixture of a divalent perfluoroalkylene group or a divalent perfluoropolyoxyalkylene group with a monovalent perfluoroalkyl group or a monovalent perfluoropolyether group (that is, a mixture of a divalent perfluoroalkylene group with a monovalent perfluoroalkyl group, a mixture of a divalent perfluoroalkylene group with a monovalent perfluoropolyether group, a mixture of a divalent perfluoropolyoxyalkylene group with a monovalent perfluoroalkyl group, or a mixture of a divalent perfluoropolyoxyalkylene group with a monovalent perfluoropolyether group). The hydrosilyl groups are preferably present at terminal ends of the molecular chain.

The divalent perfluoroalkylene group includes one represented by the following general formula (3a):

$$-C_mF_{2m}- \quad (3a)$$

wherein m is an integer of 1 to 20, preferably 2 to 10.

The divalent perfluoropolyoxyalkylene group includes one represented by the following general formula (3b):

$$-(\underset{\underset{CF_3}{|}}{C}FOCF_2)_n-(CF_2O\underset{\underset{CF_3}{|}}{C}F)_{\overline{m}}- \quad (3b)$$

wherein m and n are each an integer of 1 or more, preferably an integer of 1 to 100, satisfying m+n=2 to 100.

The divalent perfluoroalkylene group or divalent perfluoropolyoxyalkylene group (R$_f^3$) may be present as a divalent group represented by the following general formula (3c) or (3d) in each of which its both terminal ends are bonded to silicon atoms.

$$-R^2-\underset{\underset{R^3}{|}}{N}-\underset{\underset{O}{||}}{C}-R_f^3-\underset{\underset{O}{||}}{C}-\underset{\underset{R^3}{|}}{N}-R^2-, \quad (3c)$$

$$-R^2-R_f^3-R^2- \quad (3d)$$

wherein R$^2$ is a divalent hydrocarbon group having 1 to 14, preferably 1 to 6, carbon atoms, for example, an alkylene group, such as a methylene group, an ethylene group, a propylene group, a methylethylene group, a tetramethylene group and a hexamethylene group, and an arylene group, such as a phenylene group, or $$-R^4-\underset{\underset{CH_3}{|}}{\overset{\overset{CH_3}{|}}{Si}}-\langle\!\!\bigcirc\!\!\rangle$$

wherein R$^4$ is a divalent hydrocarbon group having 2 to 6 carbon atoms, for example, an alkylene group such as an ethylene group, a butylene group and a propylene group, and a cycloalkylene group such as a cyclohexylene group, preferably a divalent hydrocarbon group having 1 to 14; R$^3$ is a hydrogen atom or a monovalent hydrocarbon group having 1 to 10, preferably 1 to 6, carbon atoms, examples of the monovalent hydrocarbon group being the same groups as those exemplified for R$^1$ in the definition of the general formula (1); and R$_f^3$ is a divalent perfluoroalkylene group or a divalent perfluoropolyoxyalkylene group as defined in the general formulas (3a) and (3b).

While, the monovalent perfluoroalkyl group includes one represented by the general formula (3e):

$$C_mF_{2m+1}- \quad (3e)$$

wherein m is an integer of 1 to 20, preferably 2 to 10.

The monovalent perfluoropolyether group includes one represented by the following general formula (3f):

$$F-(\underset{\underset{CF_3}{|}}{C}FCF_2O)_x-\underset{\underset{CF_3}{|}}{C}F- \quad (3f)$$

wherein x is an integer of 1 to 10, preferably 1 to 5.

The monovalent perfluoroalkyl group or monovalent perfluoropolyether group (R$_f^4$) may be present as a monovalent group represented by the general formula (3g) or (3h) in each of which its terminal end is bonded to a silicon atom.

$$R_f^4-R^2-, \quad (3g)$$

$$R_f^4-\underset{\underset{O}{||}}{C}-\underset{\underset{R^3}{|}}{N}-R^2- \quad (3h)$$

wherein R$^2$ and R$^3$ are as defined in the general formulas (3c) and (3d), and R$_f^4$ is a monovalent perfluoroalkyl group or a monovalent perfluoropolyether group as defined in the general formulas (3a) and (3b).

The number of silicon atoms contained in the molecule of the component (C) is preferably about 4 to about 20, without particularly being limited thereto.

Specific examples of the organosilicon compound as set forth above are given below. In the following formulas, Me stands for a methyl group, and Ph a phenyl group.

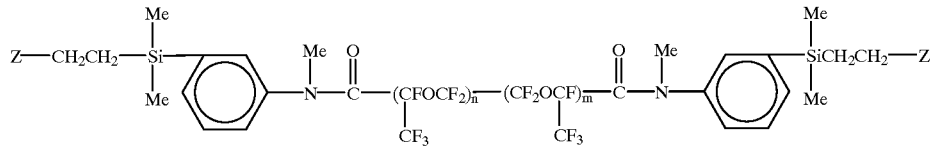

wherein n and m are each an integer of 1 or more satisfying n+m=2 to 50, and Z represents

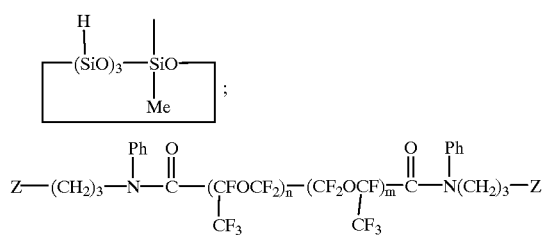

wherein n and m are each an integer of 1 or more, satisfying n+m=2 to 50, and Z is as defined above;

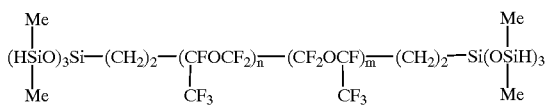

wherein n and m are each an integer of 1 or more, satisfying n+m=2 to 50, and Z is as defined above;

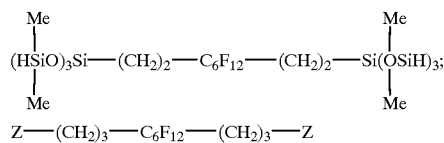

wherein Z is as defined above;

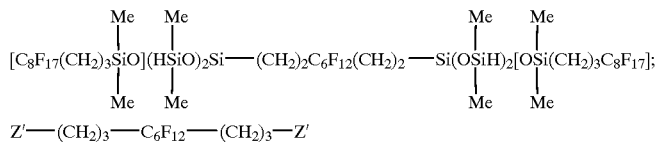

wherein Z' represents

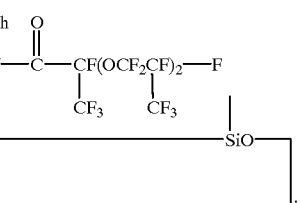

These compounds can be used singly or in a combination of two or more thereof.

In order to obtain a cured uniform gel product, as the organosilicon compounds of component (C), there are used those having compatibility with both of the linear perfluoro compounds of components (A) and (B).

The amount of the organosilicon compound to be mixed is such that the hydrosilyl groups, or SiH groups, contained in the component (C) are preferably 0.2 to 2.0 mole, more preferably 0.5 to 1.3 mole, per mole of the aliphatic unsaturated groups, such as a vinyl group, an allyl group and a cycloalkenyl group, contained in the whole composition. If the amount is too small, the degree of crosslinking may be too insufficient to form a cured gel product. If the amount is too large, foaming may occur on curing.

Platinum family metal catalysts of component (D)

The platinum family metal catalyst of component (D) used in the present invention is a catalyst for accelerating the addition reaction of the alkenyl groups contained in both components (A) and (B) with the hydrosilyl groups contained in the component (C). The platinum family metal catalyst may be any of platinum family metals, such as platinum, rhodium, ruthenium, iridium and palladium; and compounds thereof. However, from the view point of availability, platinum compounds and supported platinum catalysts are often used. These platinum catalysts include, for example, chloroplatinic acid; a complex of chloroplatinic acid with an olefin (e.g. ethylene), alcohol or vinylsiloxane; catalysts comprising platinum supported on a carrier, such as silica, alumina and carbon. The platinum family metal catalysts other than these platinum catalysts can be exemplified by $RhCl(PPh_3)_3$, $RhCl(CO)(PPh_3)_2$, $Ru_3(CO)_{12}$, $IrCl(CO)(PPh_3)_2$ and $Pd(PPh_3)_4$ wherein Ph stands for a phenyl group.

The amount of the platinum family metal catalyst to be mixed may be a so-called catalytic amount, and specifically it is generally 0.1 to 100 ppm based on the total weight of the three components (A), (B) and (C).

Other compounding agents

Various compounding agents, which are conventionally known per se, other than the above components (A) to (D) can be also added to the composition of the present invention. For example, the hardness and mechanical strength of a cured gel product obtained from the composition of the present invention can be adjusted by adding an inorganic filler, such as fumed silica, pulverized silica, diatomaceous earth, iron oxide, zinc oxide, titanium oxide, calcium carbonate, magnesium carbonate, zinc carbonate and carbon black; or an organic filler, such as resins and rubbers. These fillers may be in the form of powder, and in addition thereto, hollow, sphere (especially in the case of rubbers) and the like.

Further, it is possible to control cure reaction by adding a reaction retarder, such as polymethylvinylsiloxane cyclic compounds, acetylene compounds and organo-phosphoric compounds.

The amounts of the above compounding agents to be mixed are not particularly limited as far as the amounts don't damage the physical properties of the resulting cured gel product.

Formation of cured gel products

The addition-curable composition of the present invention comprised essentially of the above components (A) to (D) can form a cured gel product excellent in chemical resistance, solvent resistance, and low in moisture permeability by curing. The term "a cured gel product" set forth in the present specification means a cured product having partially three-dimensional structures and being in the state of showing deformation and flowability by the application of stress. Specifically, it means a cured product having a penetration of 1 to 200 when measured according to ASTM D-1403 (using ¼-scale cone) or a cured product having a hardness of 0 or less when measured by a JIS hardness meter.

The cured gel product can be formed easily in accordance with a conventional method comprising, for example, casting the composition of the present invention into a suitable vessel or coating the composition on a suitable substrate, and thereafter heating to cure. The heat treatment in this case is effected generally at a temperature of 60 to 150° C. for 30 to about 180 minutes.

Although a cured gel product per se can be also formed from a composition comprised only of the above three components (A), (C) and (D), the penetration of the cured gel product obtained therefrom may not reach the desired value when the component (C) is mixed in such an amount that the molar amount of the hydrosilyl groups contained in the component (C) per mole of the aliphatic unsaturated groups are too small (less than 0.2 mole). In this case, there remains 0.8 mole or more of the aliphatic unsaturated groups. On the contrary, since in the composition further containing the component (B) according to the present invention, the component (B) acts only as a reactive diluent and can not form three dimensional crosslink, it is possible to mix the component (C) in such an amount that the hydrosilyl groups are in the aforementioned range (preferably 0.2 to 2.0 mole, more preferably 0.5 to 1.3 mole). Thus, since the resulting cured gel product scarcely contains remaining aliphatic unsaturated group-containing components, the solvent resistance of the product is improved as shown, for example, by extreme reduction of matters extractable by a solvent, and also the chemical resistance is improved.

EXAMPLES

The present invention will be more specifically described with reference to Examples and Comparative Examples. In these examples, all parts mean parts by weight; Me, Vi and Ph respectively stand for a methyl group, a vinyl group and a phenyl group; and all viscosities were measured at 25° C.

Example 1

As the linear perfluoro compound of component (A), 60 parts of a polymer having a viscosity of 1,400 cSt represented by the following formula (I):

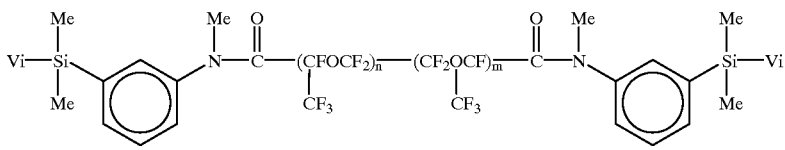

(I)

wherein m and n are each an integer of 1 or more satisfying m+n=35; as the linear perfluoro compound of component (B), 40 parts of a polymer having a viscosity of 600 cSt represented by the following formula (II):

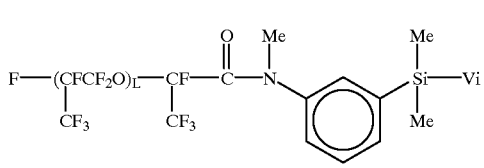

(II)

wherein L is an integer of 1 or more and is 26 on average; 0.04 part of a 50t toluene solution of ethynylcyclohexanol; as the platinum family metal catalyst of component (D), an ethanol solution (concentration in terms of platinum: 3.0 weight %) of a chloroplatinic acid-vinylsiloxane complex; and as the organosilicon compound of component (C), 11.0 parts of a fluorine-containing siloxane represented by the following formula (III):

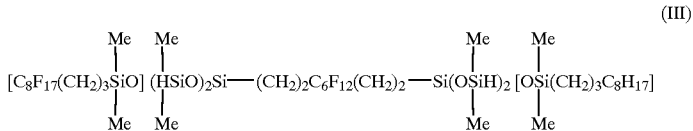

(III)

were mixed to prepare a curable perfluoro compound-containing composition. The composition was cured by heating at 150° C. for one hour. As a result, there was obtained a transparent cured gel product having a penetration of 65 [according to ASTM D-1403 (using ¼-scale cone), the same being applied hereinafter].

Example 2

A curable perfluoro compound-containing composition was prepared in the same manner as in Example 1, except that the amount of the polymer represented by the formula (I) and the amount of the polymer represented by the formula (II) each were changed to 50 parts and that 11.0 parts of the fluorine-containing compound represented by the formula (III) was replaced with 24 parts of a fluorine-containing compound represented by the following formula (IV):

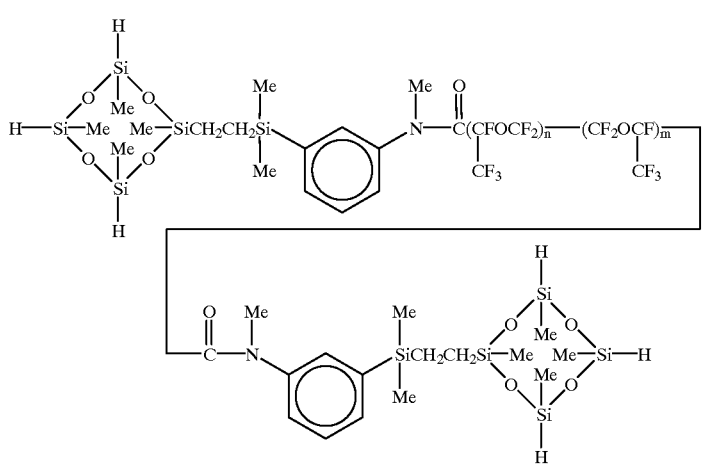

(IV)

wherein m and n are each an integer of 1 or more satisfying m+n=35. This composition was cured in the same manner as in Example 1. As a result, there was obtained a transparent cured gel product having a penetration of 42.

Comparative Example 1

A curable perfluoro compound-containing composition was prepared in the same manner as in Example 1, except that the amount of the polymer represented by the formula (I) was changed to 100 parts, the polymer represented by the formula (II) was —not used, and the amount of the fluorine-containing compound represented by the formula (III) was changed to 2.5 parts. This composition was cured in the same manner as in Example 1. As a result, there was obtained a transparent cured gel product having a penetration of 68.

Comparative Example 2

A curable perfluoro compound-containing composition was prepared in the same manner as in Example 1, except that the polymer represented by the formula (I) was replaced with 40 parts of a polymer having a viscosity of 1,000 cSt represented by the following formula (V):

(V)

wherein n is an integer of 1 or more and is 150 on average, the polymer represented by the formula (II) was replaced with 60 parts of a polymer having a viscosity of 700 cSt represented by the following formula (VI):

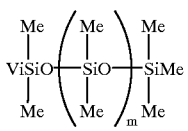

(VI)

wherein m is an integer of 1 or more and is 100 on average, and the fluorine-containing siloxane was replaced with 0.6 part of a compound represented by the following formula (VII):

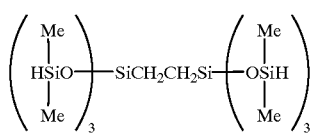

(VII)

This composition was cured in the same manner as in Example 1. As a result, there was obtained a transparent cured gel product having a penetration of 65.

[Solvent resistance and chemical resistance tests]

Each of the compositions obtained in Examples 1 to 2 and Comparative Examples 1 to 2 was cured in a glass petri dish having an inner diameter of 35 mm and a height of 15 mm. The cured product was immersed in each of the solvents and chemicals listed in Table 1 at 25° C. for 72 hours to measure the weight change of the product, whereby the rate of increase in weight was calculated. The results are shown in Table 1.

TABLE 1

|  | Example 1 Rate of weight increase (%) | Example 2 Rate of weight increase (%) | Comp. Ex. 1 Rate of weight increase (%) | Comp. Ex. 2 Rate of weight increase (%) |
| --- | --- | --- | --- | --- |
| Lead-free gasoline | 4 | 2 | 2 | >100 |
| Toluene | 2 | 2 | 2 | >100 |
| Methanol | 0 | 0 | 1 | 15 |
| Methyl ethyl ketone | 2 | 2 | 2 | 88 |
| Chloroform | 8 | 6 | 6 | >100 |
| Acetone | 3 | 2 | 2 | 73 |
| Ethyl acetate | 6 | 3 | 4 | >100 |
| 36% HCl aqueous solution | 0 | 0 | 1 | 20 |
| 98% H$_2$SO$_4$ aqueous solution | 3 | 1 | 5 | 48 |
| 62% HNO$_3$ aqueous solution | 0 | 0 | 2 | 53 |
| 40% NaOH aqueous solution | 0 | 0 | 2 | 34 |

From the results shown in Table 1, it was confirmed that the cured gel products obtained from the compositions of Examples 1 and 2 were extremely low in the rate of weight increase in various solvents and chemicals.

[Extraction test]

Fluorinated cyclic ether solvent (produced by 3M SPECIALTY CHEMICALS DIVISION, tradename: FLUORINERT FC-77) was charged in the same glass petri dish as above. After each of the cured gel products obtained in Examples 1 to 2 and Comparative Example 1 was immersed therein at 25° C. for 72 hours, the solvent was evaporated at 70° C. over 24 hours to measure the weight change after immersion. As a result, the rate of weight change was −8% in the cured gel product of Example 1 and −11% in the cured gel product of Example 2, whereas it was −28% in the cured gel product of Comparative Example 1. From these results, it was confirmed that the cured gel products of Examples 1 and 2 were by far small in extraction by the solvents as compared to that of Comparative Example 1.

What is claimed is:

1. An addition curable perfluoro compound-containing composition comprising:

(A) a linear perfluoro compound containing at least two alkenyl groups per molecule and having a perfluoro structure in its backbone chain, (B) a linear perfluoro compound containing one alkenyl group per molecule and having a perfluoro structure in its backbone chain, (C) an organosilicon compound containing at least two hydrosilyl groups per molecule, and (D) a platinum family metal catalyst.

2. The composition of claim 1, wherein the linear perfluoro compound of component (A) comprises one represented by the following general formula (1):

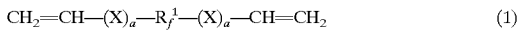

wherein X is independently —CH$_2$—, —CH$_2$O—, —CH$_2$OCH$_2$— or —Y—NR$^1$—CO—
wherein Y is —CH$_2$— or

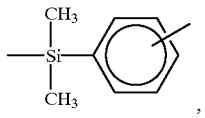

and R$^1$ is a hydrogen atom or an unsubstituted or substituted monovalent hydrocarbon group; R$_f^1$ is a divalent perfluoroalkylene group or a divalent perfluoropolyoxyalkylene group; and a is independently 0 or 1.

3. The composition of claim 2, wherein in the general formula (1), the divalent perfluoroalkylene group represented by R$_f^1$ comprises one represented by the following general formula (1a):

$$\text{—}C_mF_{2m}\text{—} \quad (1a)$$

wherein m is an integer of 1 to 10, and the divalent perfluoropolyoxyalkylene group represented by R$_f^1$ comprises a member selected from the group consisting of the groups represented by the following general formulas (1b) to (1e):

(1b)

wherein Y is a fluorine atom or a —CF$_3$ group, and p, q and r are integers satisfying p≧1, q≧1, 2≦p+q≦200, and 0≦r≦6;

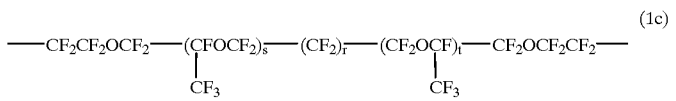

(1c)

wherein r, s and t are integers satisfying $0 \leq r \leq 6$, $s \geq 0$, $t \geq 0$, and $0 \leq s+t \leq 200$;

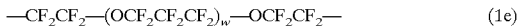
(1d)

wherein Y is a fluorine atom or a —$CF_3$ group, and u and v are integers satisfying $1 \leq u \leq 100$ and $1 \leq v \leq 50$; and

(1e)

wherein w is an integer satisfying $1 \leq w \leq 100$.

4. The composition of claim 1, wherein the perfluoro compound of component (B) comprises one represented by the following general formula (2):

$$R_f^2 - (X)_a - CH = CH_2 \quad (2)$$

wherein X and a are as defined in respect of the general formula (1) above, and $R_f^2$ is a monovalent perfluoroalkyl group or a monovalent perfluoropolyether group.

5. The composition of claim 4, wherein in the general formula (2), the monovalent perfluoroalkyl group represented by $R_f^2$ comprises one represented by the following general formula (2a):

$$C_m F_{2m+1} - \quad (2a)$$

wherein m is an integer of 1 to 20, and the monovalent perfluoropolyether group represented by $R_f^2$ comprises a group represented by the following general formula (2b) or a group represented by the general formula (2c) or both:

(2b)

wherein p is an integer of 1 or more; and

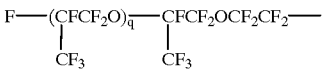
(2c)

wherein q is an integer of 1 or more.

6. The composition of claim 1, wherein the organosilicon compound of component (C) contains further, in the molecule, a divalent perfluoroalkylene group, a divalent perfluoropolyoxyalkylene group, at least one monovalent perfluoroalkyl group, at least one monovalent perfluoropolyether group, a mixture of a divalent perfluoroalkylene group with a monovalent perfluoroalkyl group, a mixture of a divalent perfluoroalkylene group with a monovalent perfluoropolyether group, a mixture of a divalent perfluoropolyoxyalkylene group with a monovalent perfluoroalkyl group, or a mixture of a divalent perfluoropolyoxyalkylene group with a monovalent perfluoropolyether group.

7. The composition of claim 1, wherein the hydrosilyl groups in component (C) are present at terminal ends of its molecular chain.

8. The composition of claim 1, wherein the amount of component (B) is 10 to 300 parts by weight per 100 parts by weight of component (A), the amount of component (C) is such that the hydrosilyl groups contained in component (C) is present in an amount of 0.2 to 2.0 mole per mole of aliphatic unsaturated groups contained in the whole composition, and the amount of component (D) is 0.1 to 100 ppm based on the total weight of the three components (A), (B) and (C).

9. The composition of claim 1, wherein the components (A) and (B) each have a viscosity of 5 to 100,000 cSt at 25° C.

10. A cured gel product having a penetration of 1 to 200 according to ASTM D-1403 using ¼-scale cone obtained by curing the composition claimed in claim 1.

* * * * *